Oct. 25, 1960  C. G. MUNTERS ET AL  2,957,321
AIR CONDITIONING APPARATUS
Filed July 18, 1958  5 Sheets-Sheet 1

INVENTOR.
CARL GEORG MUNTERS
PER GUNNAR NORBACK
BY

ATTORNEY

Oct. 25, 1960     C. G. MUNTERS ET AL     2,957,321
AIR CONDITIONING APPARATUS Filed July 18, 1958     5 Sheets-Sheet 2

INVENTOR.
CARL GEORG MUNTERS
PER GUNNAR NORBACK
BY
ATTORNEY

Oct. 25, 1960  C. G. MUNTERS ET AL  2,957,321
AIR CONDITIONING APPARATUS
Filed July 18, 1958  5 Sheets-Sheet 3

FIG. 3

INVENTORS
CARL GEORG MUNTERS
PER GUNNAR NORBACK
BY

ATTORNEY

INVENTOR.
CARL GEORG MUNTERS
PER GUNNAR NORBACK
ATTORNEY

Oct. 25, 1960     C. G. MUNTERS ET AL     2,957,321

AIR CONDITIONING APPARATUS

Filed July 18, 1958     5 Sheets-Sheet 5

INVENTOR.
CARL GEORG MUNTERS
PER GUNNAR NORBACK
BY
ATTORNEY

United States Patent Office 2,957,321
Patented Oct. 25, 1960

2,957,321

AIR CONDITIONING APPARATUS

Carl Georg Munters, 3 Danderydsvagen, Stocksund, Sweden, and Per Gunnar Norback, 1C Bergsliden, Lidingo, Sweden Filed July 18, 1958, Ser. No. 749,422

23 Claims. (Cl. 62—271)

The present invention relates to air conditioning and more particularly to an air conditioning apparatus for conditioning air in an enclosure.

One of the objects of the present invention is to provide an air conditioning apparatus for drying air to be conditioned to a low relative humidity by absorbing moisture therefrom, cooling the dehumidified air to remove the heat of absorption and controlling the temperature and relative humidity by evaporating moisture into the cooled dehumidified air.

Another object is to provide an apparatus of the type indicated which circulates air to be conditioned in parallel paths and transfers thermodynamic characteristics between the air in said parallel paths and between the air in one of said paths and a body of air continuously recirculated in the apparatus.

Another object is to provide an apparatus of the type indicated in which a body of high temperature medium is continuously recirculated through a moisture absorbing element to regenerate the element and thereby reduce the externally applied heat.

Another object is to provide an apparatus of the type indicated in which a small portion of the air to be conditioned in one compartment is delivered through a portion of a moisture transfer element to a body of recirculating air in another compartment and a corresponding quantity of said recirculating air is exhausted from the apparatus.

Another object is to provide a direct-fired heat-operated air conditioning apparatus which is economical to manufacture and reliable in operation and one having a high coefficient of performance and large capacity in a compact unit.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

The improved apparatus of the present invention is adapted to perform various steps of the methods of air conditioning, described and claimed in the copending application of Carl Munters Serial No. 520,602, filed July 6, 1955. In general, a stream of air to be conditioned is propelled through the apparatus in successive paths arranged in parallel relationship. As the air passes through the apparatus it is dried to a low relative humidity by the absorption of moisture therefrom, cooled to remove the heat of absorption and then further cooled and humidified to the required conditions by evaporating moisture therein. A thermodynamic characteristic of the air being conditioned, such as its sensible heat or moisture content, is transferred between the air in the parallel paths by a transfer element movable cyclically between the paths.

Also moisture is absorbed from the air in one of the paths and transferred to a high temperature body of regenerating medium by a moisture transfer element movable cyclically between the paths. The regenerating medium is continuously recirculated in the apparatus in a path including a heating element, such as a fuel burner. The regenerating medium may be considered as a body of air having a high moisture content and the products of combustion or may be considered as a body of high temperature superheated steam at atmospheric pressure containing sufficient air to absorb moisture from the transfer element and support combustion in the fuel burner. Because of the recirculation and re-use of the same body of regenerating medium, the moisture transfer element may be regenerated by a small quantity of air at a high temperature to economically produce a very low relative humidity in the air being conditioned. Furthermore, the thermodynamic exchange between the air entering and leaving the apparatus produces a further substantial economy in the operation of the apparatus. As a result of these economies, a high coefficient of performance is produced.

Figure 1:
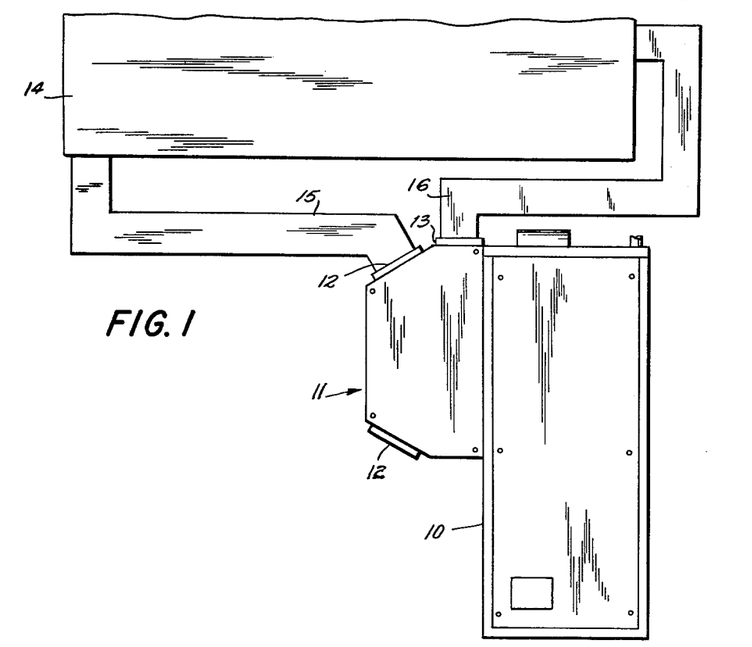
Figure 1 is a side elevational view of an apparatus incorporating the novel features of the present invention and shown connected to an enclosure to be air conditioned.

Referring to Figures 1 to 4 of the drawings, the apparatus comprises an enclosing casing 10 of generally rectangular form and having a removable housing 11 attached to one side thereof. It will be understood that the casing 10 has at least one removable panel to provide access to its interior. The enclosing casing 10 and housing 11 are of suitable dimensions to adapt them individually to pass through door openings of conventional size. Preferably, the different parts of the apparatus are assembled at a factory so that the only assembly required at the place where the apparatus is installed is to mount the housing 11 on the casing 10. Housing 11 has an air inlet opening 12 and an air outlet opening 13 which may be connected to an enclosure 14 by means of ducts 15 and 16, as illustrated in Figure 1. Additional air inlet openings 12 may be provided in housing 11 for connection to other ducts 12 or at a more convenient location and which may be closed by a cover when not used.

Figures 2, 5:
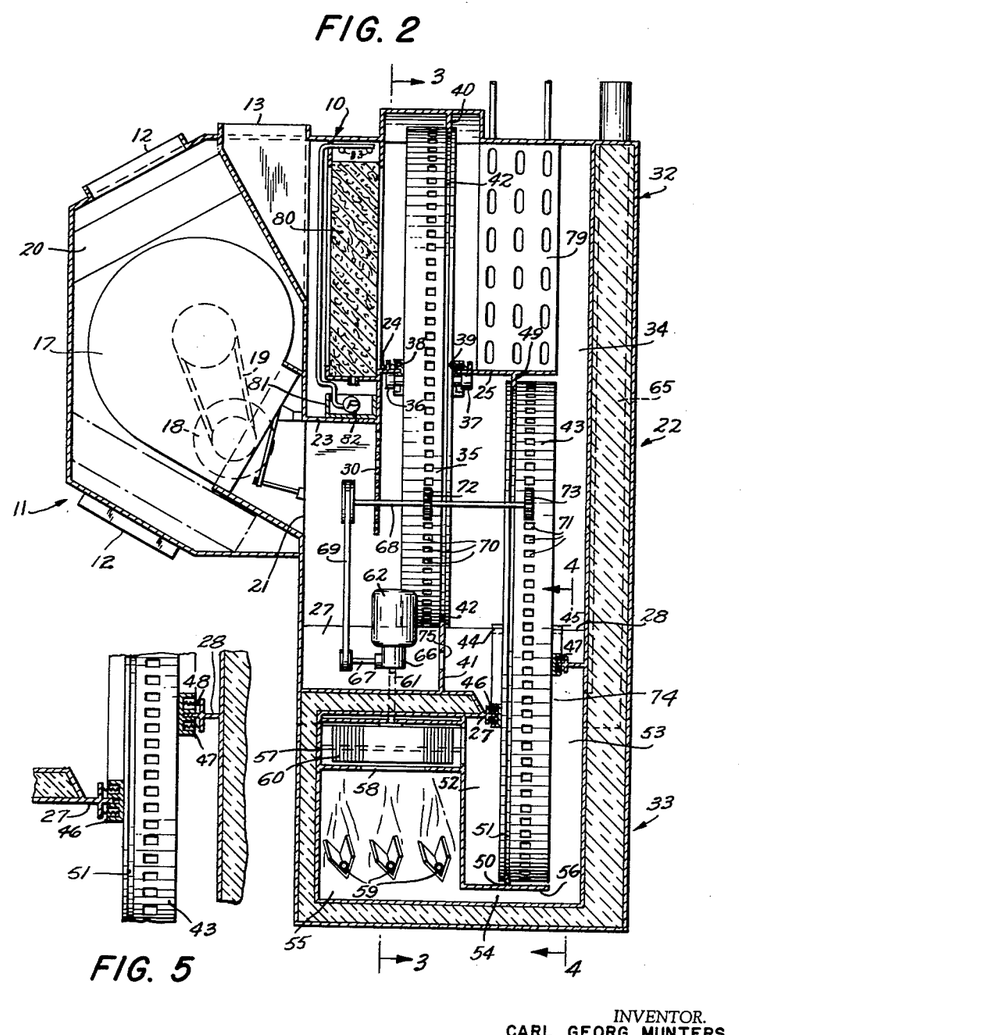
Figure 2 is a transverse sectional view through the apparatus illustrated in Figure 1 showing the partitions forming the separate air passages and the relationship of the transfer elements to the passages.
Figure 5 is a transverse sectional view taken on line 5—5 of Figure 3 to show the angularly offset radial partitions at opposite sides of the moisture transfer element to provide a communicating passage through the element between the central and lower compartments.
Figure 3:
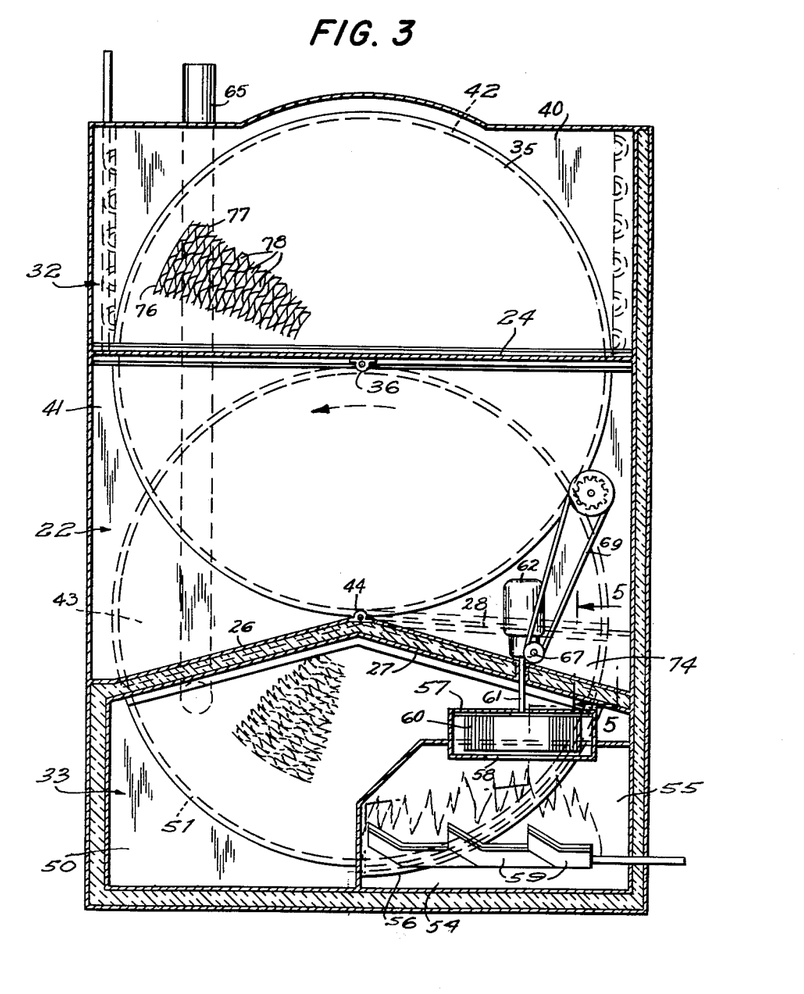
Figure 3 is a longitudinal sectional view taken on line 3—3 of Figure 2 to show the separate compartments formed by the partitions and the relationship of the overlapping transfer elements.

As shown in Figure 2, housing 11 has a fan 17 mounted therein which is driven by a motor 18 through a transmission belt 19. Fan 17 draws air from the enclosure 14 through the duct 15, air inlet opening 12 and a filter 20 in the housing. Fan 17 blows the air to be conditioned through an opening 21 in the casing 10 into a central compartment 22 defined by upper partitions 23, 24 and 25 and by lower partitions 26, 27, 28 and 29. As illustrated in Figures 2 and 3, the generally horizontal partitions 23 to 29 divide the casing into the central compartment 22, an upper compartment 32 above the central compartment and a lower compartment 33 below the central compartment. The partition 25 terminates short of the rear wall of the casing 10 to provide the connecting passage 34 between the central and upper compartments 22 and 32. Thus, air to be conditioned flows in a continuous stream from the air inlet 12 through the compartments 22 and 32, which constitute parallel air passages, to the air outlet 13 of the apparatus. A perforated plate 30 depends from partition 23 to distribute air delivered to compartment 22 through opening 21 uniformly over the face area of the compartment for a purpose as will later appear.

A wheel 35 is located in an opening between the partitions 24 and 25 with its upper half projecting into compartment 32 and its lower half projecting into compartment 22. Wheel 35 is mounted in bearings 36 and 37 at the edges of partitions 24 and 25 to rotate through the central and upper compartments 22 and 32. Sealing elements 38 and 39 are mounted on the edges of the partitions 22 and 32 and bear against the faces of the wheel 35 to prevent leakage between the central and upper compartments 22 and 32. Vertical partitions 40 and 41 in the compartments 32 and 22, respectively, extend transversely of the horizontal partitions 24, 25 and have arcuate edges overlying a continuous groove 42 adjacent the rearward face of the wheel 35. Preferably, a felt washer is provided between the arcuate edges of the partitions 40, 41 which project into the groove 42 in the periphery of the wheel 35 to seal the joint therebetween to prevent leakage of air around the periphery of the wheel.

Figure 4:
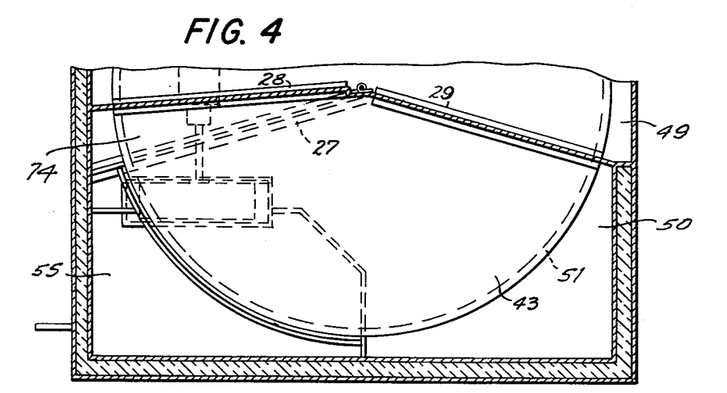
Figure 4 is a longitudinal sectional view taken on line 4—4 of Figure 2 to show the lower compartment of the apparatus at the opposite side of the transfer element from that viewed in Figure 3.

A second wheel 43 is located in an opening between lower partitions 26, 27 and 28, 29 with its upper portion projecting into the central compartment 22 at the rear of the wheel 35 in parallel overlapping relation therewith and its lower portion projecting into the compartment 33. Wheel 43 is mounted in bearings 44 and 45 at the edges of partitions 26, 27 and 28, 29 for rotation through the central and lower chambers 22 and 33. As shown in Figure 3, the partitions 26 and 27 project upwardly from opposite sides of the casing 10 at an angle less than 180° with the bearing 44 located at the apex of the partitions. The partition 28, as shown in Figure 4, overlies the opposite side of the wheel 43 in angularly related spaced relation partition 27 while the partition 29 overlies the opposite side fo the wheel directly at the rear of the partition 26. Sealing elements 46 and 47 are mounted on the partitions 26, 27 and 28, 29 to bear against the sides of the wheel to prevent leakage of air between the central and lower compartments 22 and 33 except through the wheel between the angularly offset partitions 27 and 28 as later explained in detail. As shown in Figure 5, the sealing elements 46, 47 are in the form of shoes slidably mounted on the edges of the partition walls 26, 27 and 28, 29 and yieldingly pressed against the sides of the wheel 43 by springs 48. Vertical partitions 49 and 50 are provided in the central and lower compartments 22 and 33 which have arcuate edges engaging a groove 51 in the periphery of the wheel 43 at its forward edge to provide a seal therebetween.

The lower compartment 33 is constructed to provide a closed circuit through and around the wheel 43 in which a body of regenerating medium is continuously recirculated. The circuit comprises a chamber 52 at the front of the wheel 43 and vertical partition wall 50, a chamber 53 at the rear of the wheel and vertical partition and an opening in the vertical partition forming a passage 54 between the chambers beyond the outer periphery of the wheel, see Figures 2 and 3. A combustion chamber 55 is provided in the path of the recirculating regenerative air which is formed by a box like structure in a portion of the chamber 52 at the forward side of the wheel 43 and spaced from the latter. A partition wall 56 extends from the combustion chamber 55 rearwardly under the wheel into the chamber 53 which further defines the passage 54 between the compartments. The casing of a fan 57 is provided in the upper wall of the combustion chamber 55 and has an axial air inlet opening 58 therein which draws a gaseous regenerating medium from the chamber 53 at the rearward side of the wheel 43 through the passage 54 into the combustion chamber. The regenerating medium then flows through the axial air inlet opening 58 of the fan 57 which propels it into the chamber 52 at the forward side of the wheel 43 and then through the wheel to continuously recirculate the medium in the compartment 33. Burners 59 are provided in the combustion chamber 55 which burn a fuel, preferably gas, directly in regenerating medium. As shown in Figure 2, the walls of the casing 10 and the partitions 26 and 27 forming the compartment 33 as well as the back wall of the casing are insulated to retain the heat in the regenerating medium and prevent its transmission to the air to be conditioned in compartment 22.

The impeller 60 of the fan 57 is mounted on a shaft 61 which is driven by an electric motor 62. In the illustrated embodiment the motor also operates through a reduction gearing and driving mechanism to rotate the wheels 35 and 43. The driving mechanism comprises a reduction gear box 66, a drive shaft 67, a driven shaft 68 and connecting belt 69. The periphery of the wheels 35 and 43 are notched to provide gear teeth 70 and 71 engaged by spur gears 72 and 73 on the driven shaft 68. Thus, the wheels 35 and 43 are rotated at a slow rate by the driving motor 62.

The wheel 43 has a sector exposed in the central chamber 22 greater than 180° due to the inclination of the partitions 26 and 27 while the sector of the wheel extending into the lower chamber 33 extends through an arc of less than 180°. As previously explained, the partitions 27 and 28 at opposite sides of the wheel 43 at one side of its axis are angularly displaced to provide a small section 74 providing a path through the wheel communicating between two chambers 22 and 33. An exhaust stack 65 also is mounted in the insulated back wall of casing 10 with its lower end communicating with the chamber 53 in compartment 33 at the side opposite the combustion chamber 55 to exhaust a quantity of regenerating medium corresponding to the amount of air supplied through sector 74.

The wheels 35 and 43 are composed of an air permeable mass, which, in the illustrated embodiment, comprises alternate plain and corrugated thin paper sheets of a fibrous non-metallic material. These plain and corrugated sheets 76 and 77 divide the wheel into a plurality of closely adjacent cells or passages 78 open at both ends at opposite sides of the wheel and extending axially therethrough. Both wheels 35 and 43 may operate as moisture transfer elements or wheel 35 may operate as a heat transfer element and wheel 43 as a moisture transfer element. The wheel 35 in either case is subjected to air at a relatively low temperature and may be composed of ordinary paper of wood or rag fibers, but the wheel 43 is subjected to a relatively high temperature and preferably comprises sheets of asbestos or mineral paper. When the wheels 35 and 43 act as moisture transfer elements the paper sheets 76 and 77 are impregnated with a hygroscopic salt, such as lithium bromide, and are rotated very slowly at a rate of 10 revolutions per hour or less. When the wheel 35 is used as a heat transfer element, it is rotated at a much higher speed and the driving means is modified to produce the required speed for the particular operating conditions. The plain and corrugated sheets 76 and 77 of the wheels 35 and 43 are closely spaced to give a large capacity in a wheel of relatively small diameter and width. For this purpose, the plain sheets 76 are spaced less than 3 mm. and preferably less than 2 mm. Such a construction of moisture and heat transfer wheels 35 and 43 are described in greater detail in the copending applications Serial Nos. 442,686 and 442,687, filed July 12, 1954, both of which applications are now abandoned.

When both of the wheels 35 and 43 operate as moisture transfer elements they absorb moisture from the air flowing through the central compartment 22 and dry the air to a low absolute moisture content, but increase the temperature of the air due to the conversion of the latent heat of the absorbed moisture to sensible heat. The dehumidified hot air then flows through the passage 34 at the rear of the wheel 43 and in a path through compartment 32 parallel with the path of flow in compartment 22. During flow through the compartment 32, the air contacts a cooling element 79, the upper portion of the wheel 35 and an evaporative pad 80 before it leaves through the outlet 13. The cooling element 79 is in the form of a finned coil mounted on the horizontal partition 25 in the casing at the rear of the upper portion of wheel 35 and extends across the entire width of the compartment to remove sensible heat from the air. The evaporator pad 80 comprises an air permeable water absorbent material and is mounted in the casing above the horizontal partition 23 at the front of wheel 35. A sump trough 81 is mounted on the partition 23 to collect water draining from the evaporator pad and the water is recirculated by a pump 82 and delivered to the top of the pad through nozzles 83.

Figure 6:
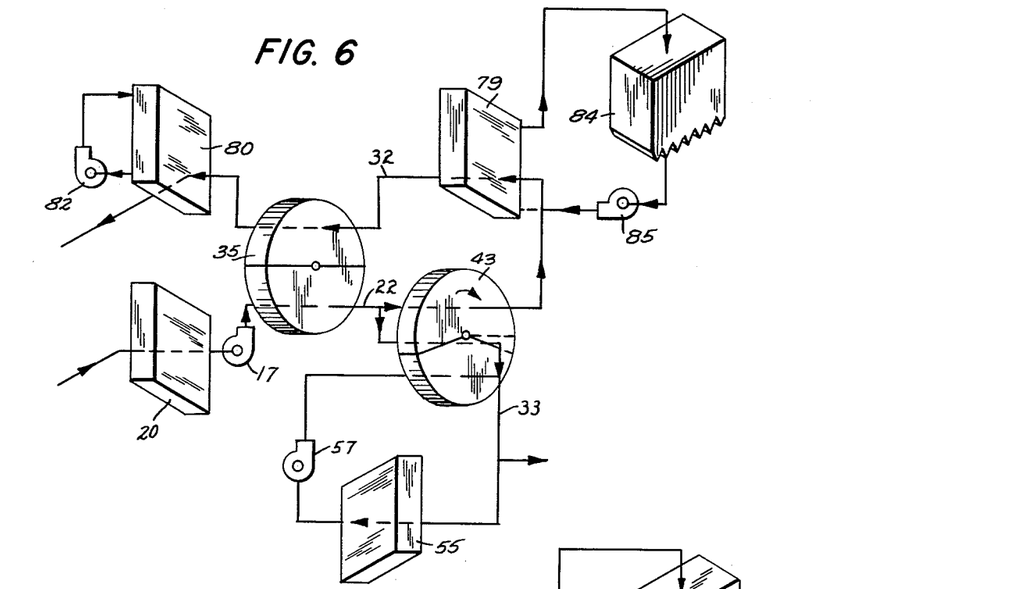
Figure 6 is a diagrammatic view showing the paths of flow through the different air conditioning elements of the apparatus.

Preferably, the cooling medium supplied to the finned coil cooling element 79 is water which is cooled by evaporative cooling in a cooling tower 84 illustrated diagrammatically in Figure 6. The cooling tower may be of the type described and claimed in U.S. Letters Patent 2,809,817 and 2,809,818, issued October 15, 1957. As illustrated in Figure 6, the water flows through the cooling tower packing where it is contacted by air to evaporate a portion of the water. The water is cooled by evaporation to a temperature closely approaching the wet bulb temperature for the particular operating conditions and is circulated by a pump 85 through the cooling element 79 and back to the top of the tower. One form of the invention having now been described in detail, the mode of operation is explained below.

As will be observed by reference to Figures 1, 2 and 6, air from the enclosure 14 is drawn by the fan 17 into the housing 11 through the duct 15 and is then propelled through the opening 21 in the casing 10 into the central compartment 22 forming one passage through the apparatus. The air is distributed by perforated plate 30 uniformly over the face of moisture transfer wheel 35 and passes through the axially arranged cellular passages 78 in its lower portion. As the air contacts the closely adjacent hygroscopic walls of the passages 78 in the wheel 35, some moisture is absorbed from the air to partially dehumidify the air. The air then flows through similar passages 78 in the upper portion of the wheel 43 where it is further dried to a very low relative humidity. The hot dry air then flows through the connecting passage 34 into the upper compartment 32 and forwardly therethrough in a path parallel with the path of flow through the compartment 22. The stream of air in compartment 32 contacts the finned coils of the cooling elements 79 which removes sensible heat from the air and cools it to a temperature approaching the temperature of the cooling water from the cooling tower. The stream of air next flows through the tubular cell 78 in the upper portion of wheel 35 and is further cooled by evaporation of the moisture initially removed from the stream in compartment 22. The stream of air is further cooled by evaporating moisture therein as it passes through the evaporator pad 80. It will be understood that the flow of water in the evaporator pad 80 is regulated by a suitable control means to control the temperature and humidity of the air leaving the apparatus through the outlet 13.

Simultaneously with the flow of air to be conditioned through the compartments 22 and 32, a separate stream of regenerating medium is continuously recirculated by the fan 57 in the compartment 33. Air from the chamber 53 at the rearward side of the wheel 43 is drawn by the fan 57 through the passage 54 into the combustion chamber 55. The fuel burners 59 in the combustion chamber heat the regenerating medium to a high temperature which is delivered by the fan 57 to the chamber 52 at the forward side of the wheel 43. This chamber 52 acts as a plenum at a higher pressure than the suction chamber 53 to cause the high temperature regenerating medium to flow through the lower portion of the wheel 43 and remove moisture therefrom to regenerate the wheel. Simultaneously, a small portion of the air in the compartment 22 flows through the sector 74 of wheel 43 between the angularly offset sealing pads 46 and 47 into the suction chamber 52 of compartment 33 to provide a small quantity of make-up air to the body of recirculating air and, simultaneously, cause a corresponding amount of regenerating medium to be exhausted through the stack 65.

Figure 8:
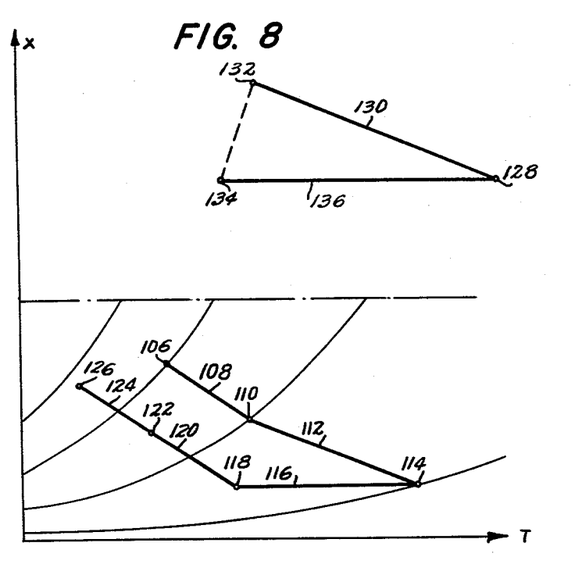
Figure 8 is a psychrometric chart showing the temperature and moisture characteristics of the air to be conditioned and regenerative medium as it passes through the various elements illustrated in Figure 6 when a plurality of moisture transfer elements are used.

Thermodynamic exchanges in the apparatus will be better understood by the aid of the psychrometric chart shown in Figure 8 and the diagram indicating the conditions of the air at different points in the apparatus. In Figure 8, the abscissa represents temperature and is marked T and the ordinate represents the absolute moisture content of the air and is marked by X to indicate the moisture in grams per kilogram of air.

For purposes of description, let it be assumed that the enclosure 14 is to be maintained at a temperature of 25.5° C. and a relative humidity of 55% indicated at the point 106 on the psychrometric chart. As the air to be conditioned flows through the lower portion of the moisture transfer wheel 35, a psychrometric change occurs in the air along the line 108 to the point 110 representing absorption of moisture in an amount corresponding to the vertical difference between the points 106 and 110 on the ordinate. The air then flows through the wheel 43 where it is further dried along the line 112 to the point 114. At the point 110 the air has a psychrometric condition corresponding to 34° C. and 34% relative humidity while the corresponding values at the point 114 is 52° C. and 4% relative humidity. These conditions are to be considered as indicative rather than absolute for the purpose of explaining the operation of the apparatus. The cooling element 79 cools the air along the line 116 parallel with the abscissa to the point 118 representing a psychrometric condition of 32° C. and 11% relative humidity. As the air passes through the upper sector of the wheel 35 in the compartment 32 the air picks up the moisture which had previously been absorbed in compartment 22 indicated by the line 108 and the evaporation of this moisture into the air stream is indicated by the line 120 to the point 122 which represents a psychrometric condition of 24° C. and 38% relative humidity. In the evaporative pad 80 the air is further cooled and its relative humidity increased by the evaporation of water therein as indicated by the line 124 to the point 126 representing the psychometric condition of 16° C. and 90% relative humidity which is the condition of the air as it is returned to the enclosure 14.

Because the wheel 35 exchanges moisture between different portions of the stream of air to be conditioned in compartments 22 and 32, the wheel 43 is required to remove only that portion of the moisture which corresponds to the vertical distance on the ordinate between the points 110 and 114 instead of the distance between the points 106 and 114. Thus, there is a considerable economy in the amount of moisture ultimately required to be removed from the air and disposed of and the amount of heat required to regenerate the moisture transfer wheel 43. Thus, the apparatus operates with a high coefficient of performance.

The regenerating medium recirculated in the compartment 33 consists of air, products of combustion and steam. As the medium is continuously recirculated and heated in the combustion chamber 55 during each pass through the wheel 43, its temperature and moisture content is very high. As a result, the triangular diagram at the upper part of Figure 8 does not truly represent the temperature and moisture content on the same scale as the diagram at the lower part of the chart. Instead, the triangular diagram in Figure 8 should be located at a much higher level and considerably to the right of the lower diagram on the psychrometric chart, but spaced limitations on the drawing prevents a correct illustration. After the regenerating medium has passed the fuel burners 59 it has a psychrometric condition 128 corresponding to 170° C. and 2% relative humidity. As the regenerating medium passes through the lower portion of the moisture transfer wheel 43, it evaporates moisture from the plain and corrugated paper sheets 76 and 77 at a rapid rate and because of the evaporation cools the medium along the line 130 to the point 132. In the final condition 132 the medium has a relative humidity between 20% and 25%. After leaving the wheel 43 the make-up air which flows from the compartment 22 through the sector 74 of the wheel is mixed with the recirculating medium which produces a psychrometric condition corresponding to the point 134 having a lower relative humidity and temperature after which the medium is heated by the fuel burners 59 as it passes through the combustion chamber 55 along the line 136 to the point 128 previously described.

Because of the direct fired heating in the combustion chamber 55, heating elements with a large heat transfer surface are eliminated which results in a saving of space and of considerable weight. Furthermore, a considerably improved heat economy is accomplished as all of the heat from the burners 59 is directly absorbed in the regenerating medium with a resulting higher temperature. The only requirement is that sufficient make-up air be supplied to the recirculating body of regenerating medium to absorb the required moisture and support combustion and that a corresponding amount of the regenerating medium be exhausted from the apparatus. To this end, fan 17 maintains a higher pressure in the central compartment 22 than in the suction chamber 53 of compartment 33. This higher pressure by the fan 17 is necessary to overcome the resistance to the flow of air to be conditioned through the wheels 35 and 43 in the compartment 32, the cooling element 79, and wheel 35 and evaporative pad 80 in the compartment 32. On the other hand, the fan 57 in compartment 33 only produces the pressure necessary to cause the regenerating medium to flow through the wheel 43 and its recirculating path. Also, compartment 22 is located at the pressure side of fan 17 and communicates with the compartment 33 through sector 74 of wheel 43 at the suction side of the fan 57 so that air will always flow from the central to the lower compartment. Furthermore, the pressure difference between compartments 22 and 32 will provide a sufficient head to always cause air to flow toward chamber 33, due to any leakage at the seals 46 and 47 and exhaust through the stack 65 and thereby prevent contamination of the air being conditioned by the products of combustion.

The sector 74 of the moisture transfer wheel 43 between the angularly offset seals 46 and 47 produces three separate functions. The first function of the sector 74 is to proportion the amount of make-up air delivered to the compartment 33 to insure combustion of the fuel in the fuel burners 59 and produce a complete regeneration of the wheel. This amount of air which passing through the sector 74 does not constitute more than 10% of the body of recirculating air passing through the wheel 43. A correspondingly small amount of regenerating medium escapes through the stack 65 which contains removed moisture as well as products of combustion. A second function of the sector 74 is to flush the products of combustion from the tubular cells of the wheel 43 prior to their movement into the compartment 22. Thus, the flow of air through the wheel 43 avoids any possibility of contamination of the air to be conditioned by the products of combustion. A third function of the sector 74 is to cool a portion of the wheel 43 between the angularly related seals 46 and 47 prior to its movement into the compartment 22 to avoid an undesirable heat transfer from the high temperature compartment 33 and to simultaneously pre-heat the make-up air as it enters the compartment.

The recirculating body of regenerating medium permits the moisture transfer wheel to be regenerated at a high temperature with only a small quantity of fresh air. This small quantity of air is capable of picking up a large amount of moisture per unit of weight of the air because of its high temperature. This, in turn, reduces the amount of external heat required to heat the small quantity of make-up air which results in a high economy and coefficient of performance. The volume of added air is controlled by the size of the sector 74 in the moisture transfer wheel 43 through which the make-up air is supplied. A further advantage is that the small quantity of air added to the body of recirculating medium may be taken directly from the stream of air being conditioned and eliminates the necessity of a separate outside air condition and duct system required for regenerating the moisture transfer wheel by a single pass of air.

When the wheel 35, as illustrated in Figure 6, operates as a heat transfer element instead of a moisture transfer element, the plain and corrugated paper sheets 76 and 77 are non-hygroscopic and the wheel is rotated at a much higher speed. With this modification the apparatus operates in the same way as previously explained except that wheel 35 exchanges heat from the air in compartment 32 to the air in compartment 22 and does not require the air to be dried to as low a relative humidity by the wheel 43 when a cooling element 79 of the same capacity is used.

Figure 9:
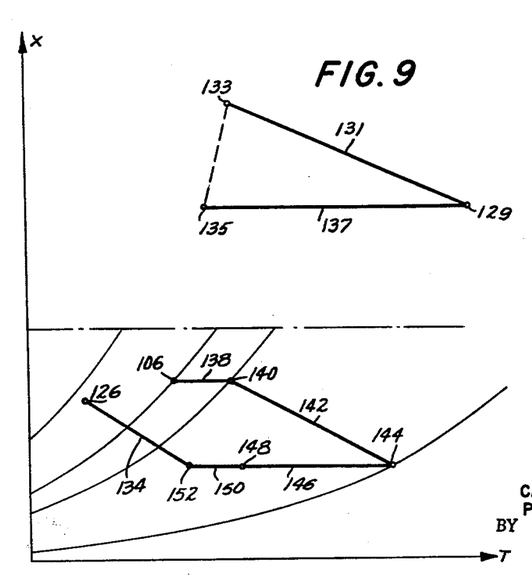
Figure 9 is a psychrometric chart like that illustrated in Figure 8 and showing the temperature and moisture characteristics of the air to be conditioned and regenerating medium as they pass through the various elements when a heat transfer element is used.

The psychrometric characteristics of the apparatus when a heat transfer wheel 35 is substituted for a moisture transfer wheel is illustrated in the diagram in Figure 9. Assuming that the room air has the same psychrometric condition 106, as in the example illustrated in Figure 8, the wheel 35 will increase the temperature of the air along the line 138 to the point 140 which represents a psychrometric of 31° C. and 40% relative humidity. Wheel 43 then dries the air along the slanting line 142 to the point 144 at which point the temperature is 48° C. and has a relative humidity of 9%. The cooling element 79 cools the air along the line 146 to the point 148 representing the psychrometric condition of 32° C. and 20% relative humidity. As the air to be conditioned passes through the upper portion of the wheel 35, a further cooling takes place along the line 150 to the point 152 representing a temperature of 26.5° C. and 27% relative humidity. The lines 138 and 150 thus correspond with one another. In the wet pad 90 the air is further cooled and humidified along the line 134 to the final condition 126 which is the same as in the diagram of Figure 8.

On the regenerative side the regenerating medium in front of the wheel 43 has a psychrometric condition indicated at the point 129 of 135° C. and 6% relative humidity. As the regenerating medium passes through the lower portion of the wheel 43 it picks up moisture along the line 131 to the point 133 where it has a relative humidity of 35% to 40%. By adding fresh air to the body of recirculating air through the sector 74 of the wheel 43, a condition is produced corresponding to the point 135 on the diagram. The fuel burners 59 then heat the medium along the line 137 to the point 129. It will be noted that the lines 131 in the upper diagram and 142 in the lower diagram correspond with one another.

Figure 7:
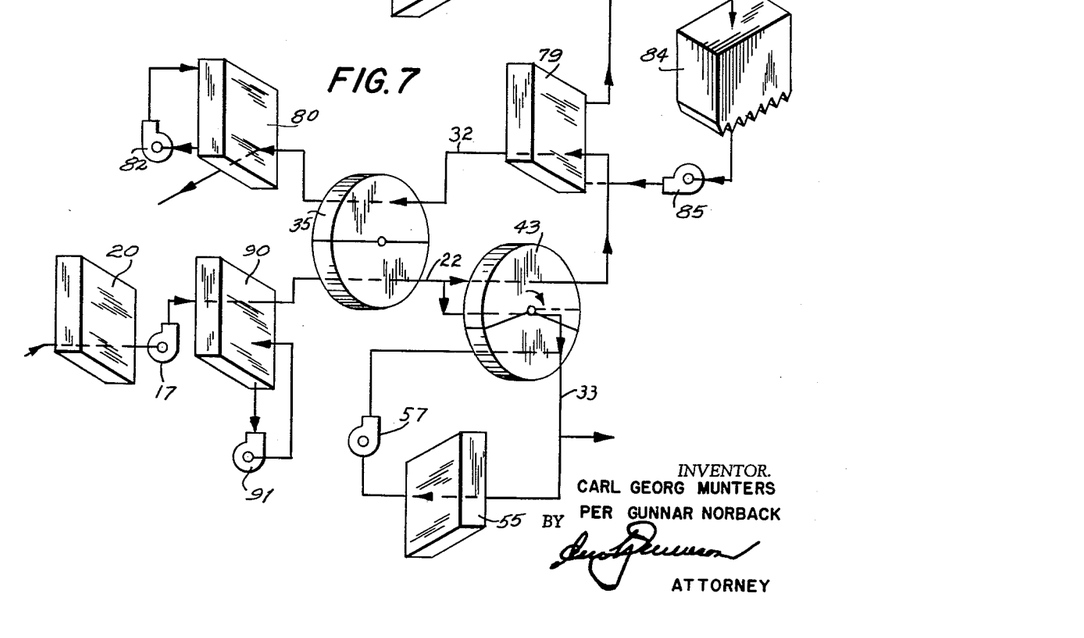
Figure 7 is a view similar to Figure 6 showing a modified arrangement of elements.

Figure 7 diagrammatically illustrates a further modification of the apparatus illustrated in Figures 1 to 5. In this modified construction, the wheel 35 is a heat transfer element and the wheel 43 is a moisture transfer element as in the previously explained modification. In addition, a second evaporator pad 90 is provided between the fan 17 and wheel 35 which is saturated with water to cool the air by evaporative cooling. Evaporator pad 90 may be mounted in the casing 10 in front of the lower portion of the wheel 35 and a circulating pump 91 recirculates water through the pad. With this modified construction illustrated in Figure 7, the air from the enclosure 14 first flows through the evaporative pad 90 which cools the air by evaporative cooling. The air then flows through the lower portion of the heat transfer wheel 35 to cool the packing sheets 76 and 77 therein after which the air flows through the upper portion of the moisture transfer wheel 43. The air then flows through the cooling element 79 to remove the sensible heat of absorption and then through the upper portion of the wheel 35 which further cools the air. The final temperature and relative humidity of the air delivered back to the enclosure 14 is then controlled by the evaporative pad 80. The circuit for recirculating a regenerating medium through the lower portion of the moisture transfer wheel 43 is identical with that disclosed in Figures 1 to 6. With the arrangement of elements illustrated in Figure 7 the moisture transfer wheel 43 does not reduce the moisture content level to as low a degree as that in the arrangement illustrated in Figure 6 but the stream of air to be conditioned is anhydrously cooled by the wheel 35 so that it is cooled without the addition of moisture. No psychrometric diagram of the modified construction of Figure 7 is illustrated but its characteristics will be apparent from the description of the diagram in Figure 9.

The apparatus of the present invention can also be used for heating during the winter months. When the apparatus is used for heating the wheel 43 would be rotated at a high speed so that it functions as a heat exchanger instead of a moisture exchanger. The wheel 35 can be disconnected, but because of accumulation of dust it is advisable to rotate this wheel during a heating operation. Thus, the wheels 35 and 43 are swept by the air being heated in alternate directions which has a cleaning effect. The speed of rotation of the wheel 35 should be slow so that it will not function as a heat exchanger.

It will now be observed that the present invention provides an apparatus for conditioning air by successively drying, cooling and humidifying the air which utilizes only natural media such as air and water and the application of heat. It also will be observed that the present invention provides an apparatus in which a thermodynamic characteristic is exchanged between different portions of a stream of air to be conditioned to reduce the amount of work done on the air and thereby improve the coefficient of performance of the apparatus. It also will be observed that the moisture transfer wheel is regenerated by a body of recirculating medium heated to a high temperature by burning fuel directly therein to further improve the coefficient of performance of the apparatus. It will still further be observed that a small quantity of make-up air is continuously supplied to the body of regenerating medium through a portion of the moisture transfer wheel and that a corresponding small amount of the medium is exhausted from the apparatus.

While several embodiments of the invention are herein illustrated and described, it will be understood that further changes may be made in the construction and arrangement of elements without departing from the spirit or scope of the invention. Therefore, without limitation in this respect, the invention is defined by the following claims.

We claim:

1. In an apparatus for conditioning air, an enclosing casing having an air inlet and an air outlet, partitions in said casing forming three passages in side by side relationship, one of said passages being connected to the air inlet and another of said passages being connected to the air outlet, a connecting passage between the air inlet and outlet passages, means for propelling a stream of air to be conditioned successively through the connected passages in parallel paths from the air inlet to the air outlet, means for propelling a regenerating medium through the other passage, a plurality of air permeable transfer elements each mounted to rotate through two adjacent passages to transfer thermodynamic characteristics between the air in the different passages, said transfer elements having overlapping portions in the air inlet passage with a portion of one projecting into the adjacent air outlet passage and a portion of the other element projecting into the regenerating passage, cooling elements at each side of the transfer element in the outlet passage, said transfer element projecting into the regenerating passage comprising a hygroscopic material to transfer moisture from the air to be conditioned to the regenerating medium, and means for heating the regenerating medium in said other passage.

2. In an apparatus for conditioning air, an enclosing casing having an air inlet and an air outlet, partitions in said casing forming three separate passages in side by side relationship, an air permeable transfer element mounted to rotate in two adjacent passages, a second air permeable transfer element mounted to rotate between one of said two passeages and the other passage, said partitions forming connecting passages between the passage common to both transfer elements and the other passages, respectively, at least one of said transfer elements comprising a hygroscopic material to absorb moisture from the air to be conditioned, means for propelling air to be conditioned successively through two of the connecting passages in parallel air inlet and outlet paths, means for propelling a regenerating medium through the other passage to regenerate the moisture absorbing transfer element, and the area of the connecting passages controlling the division of air from the common passage to the other passages, respectively.

3. In an apparatus for conditioning air, an enclosing casing having an air inlet and an air outlet, partitions in said casing forming a passage for air flowing from the air inlet, a passage for air flowing to the air outlet and another passage for recirculating a body of regenerating medium in the casing, a plurality of air permeable transfer elements each mounted to rotate through two adjacent passages to transfer thermodynamic characteristics between the air in the different passages, at least one of said transfer elements comprising a hygroscopic material to transfer moisture from the air in one passage to the body of medium recirculating in the casing, a heater for heating the body of recirculating medium to regenerate the transfer element, and means for adding air to and exhausting medium from the body of recirculating medium.

4. In an apparatus for conditioning air for an enclosure, an enclosing casing having an air inlet for receiving air from the enclosure and an air outlet for delivering air to the enclosure, means for mounting air permeable transfer elements in the casing to rotate about spaced axes in side by side relationship so that portions of two transfer elements overlap each other and other portions of each element project from overlapping portions, partitions in said casing cooperating with said transfer elements to form one air passage through the overlapping portions of the elements and separate air passages through the other portions of the elements, respectively, means for propelling air from the enclosure through the passage having the overlapping portions of the transfer elements therein, propelling air through the passage leading to the enclosure and portion of one transfer element therein and propelling a separate body of regenerating medium through the other passage and portion of the transfer element therein, said last named transfer element comprising a hygroscopic material for transferring moisture from the air from the enclosure to the separate body of regenerating medium, said partitions in said casing forming a continuous path through and around said last named portion of the moisture transfer element to recirculate and re-use said body of medium to regenerate said element, a fuel burner in said casing in the path of said body of recirculating medium, and means for supplying air to and exhausting air from said body of recirculating medium.

5. In an apparatus for conditioning air in an enclosure comprising an enclosing casing having an air inlet for receiving air from the enclosure, and an air outlet for delivering conditioned air to the enclosure, partitions in said casing forming a central compartment connected to the air inlet, an upper compartment connected to the air outlet and a lower compartment in which a body of air is recirculated, a plurality of air permeable transfer elements each mounted to rotate in the casing through the central compartment in side by side overlapping relationship and the upper and lower compartments, respectively, at least one of said transfer elements comprising a hygroscopic material to transfer moisture from the air in the central compartment to the body of air recirculating in the other compartment to regenerate the element, a fuel burner in the casing in the path of the body of recirculating air, means connecting the central compartment to the other two compartments and controlling the division of air to the upper and lower compartments, and means for exhausting an amount of air from the body of recirculating air corresponding to the amount of air delivered thereto from the central compartment.

6. In an apparatus for conditioning air in an enclosure, an enclosing casing having an air inlet for receiving air from the enclosure and an air outlet for delivering conditioned air to the enclosure, a plurality of air permeable transfer wheels mounted to rotate in the casing about spaced axes in side by side relationship so that portions of the transfer wheels overlap each other, partitions in said casing cooperating with said wheels to form a central passage through the overlapping portions of the wheels, an upper passage through the other portion of one wheel and a lower passage through the other portion of the other wheel, said partition between the central and upper passages providing communication therebetween at one end, the partitions between the central passage and the lower passage having portions at opposite sides of the other wheel offset angularly to provide a passage through the wheel between the central and lower passage, partitions in the lower passage forming a continuous loop circuit through the portion of the wheel projecting therein, a fan for circulating air from the air inlet through the central and upper passages to the air outlet, a second fan for recirculating a body of regenerating medium in the loop circuit in the lower passage to regenerate the wheel, a fuel burner in the path of the recirculating medium, said fans being so arranged as to cause air to flow from the central passage through the wheel to the lower passage between the angularly offset partitions, and means for exhausting an amount of air from the body of air in the lower passage corresponding to the amount of air delivered thereto from the central passage.

7. In an air conditioning apparatus, an enclosing casing having an air inlet and an air outlet, partitions in said casing forming a passage from the air inlet through the casing, a passage from the end of the air inlet passage to the air outlet and a passage in which a body of regenerating medium is recirculated, an air permeable moisture transfer wheel of hygroscopic material mounted to rotate through the partition means between the air inlet and outlet passages, a second air permeable moisture transfer wheel of a hygroscopic material mounted to rotate in the partition between the air inlet passage and passage for recirculating a body of regenerating medium, a cooling element in the outlet passage at one side of the moisture transfer wheel, an evaporator pad in the outlet passage at the opposite side of the moisture transfer element, a fuel burner in the regenerating passage, a fan for propelling air from the air inlet to the air outlet, and a second fan for continuously recirculating the body of regenerating medium in the regenerating passage.

8. In an air conditioning apparatus, an enclosing casing having an air inlet and an air outlet, partitions in said casing dividing the casing into a passage connected to the air inlet, a passage connected to the air outlet and a passage in which a body of regenerating medium is recirculated, an air permeable heat transfer wheel mounted to rotate in the partitions between the air inlet and outlet passages, an air permeable moisture transfer wheel mounted to rotate in the partition between the air inlet and regenerating passages, said heat and moisture transfer wheels having portions overlapping in the air inlet passage, said air inlet and outlet passages being connected for the continuous flow of air therethrough, a cooling element in the air outlet passage between the moisture and heat transfer wheels, an evaporator pad in the air outlet passage between the heat transfer wheel and air outlet, a fuel burner in the path of recirculating medium in the regenerating passage, a fan for circulating air through the air inlet and outlet passages, and a second fan for recirculating heated regenerating medium in the regenerating compartment.

9. In an apparatus for conditioning air, an enclosing casing, partition means dividing the casing into separate adjacent compartments, a moisture transfer wheel comprising an air permeable hygroscopic material mounted to rotate in the casing and extending through the partition means into the adjacent compartments, a fan for propelling a stream of air to be conditioned through one of the compartments and the portion of the wheel therein, partition means in the other compartment forming a loop circuit through and around the portion of the wheel therein, a heater in said loop circuit, a fan for continuously recirculating a body of gaseous regenerating medium through the loop circuit to regenerate the moisture transfer wheel, means for rotating the wheel to transfer moisture from the air to be conditioned to the regenerating medium, and means for supplying air to and exhausting medium from the body of regenerating medium.

10. In an apparatus for conditioning air, an enclosing casing, partitions dividing the casing into adjacent compartments, a moisture transfer wheel comprising an air permeable hygroscopic material mounted to rotate in the casing and extending through the partitions into the adjacent compartments, a fan for propelling a stream of air to be conditioned through one of the compartments and the portion of the wheel therein, partitions in the other compartments forming a loop circuit through and around the portion of the wheel therein, a fan for continuously recirculating a body of gaseous regenerating medium through the loop circuit to regenerate the moisture transfer wheel, a heater in said loop circuit for heating the recirculating medium, the partitions dividing the casing into separate adjacent compartments having angularly offset portions at opposite sides of the wheel to provide a sector forming a communicating passage between the two compartments through which a small quantity of air to be conditioned flows to the loop circuit, and a conduit connected to the loop circuit for exhausting a corresponding amount of the recirculating medium.

11. In an apparatus for conditioning air, an enclosing casing, partitions dividing the casing into separate adjacent compartments, a moisture transfer wheel comprising an air permeable hygroscopic material mounted to rotate in the casing and extending through the partitions into the adjacent compartments, a fan for propelling a stream of air to be conditioned through one of the compartments and the portion of the wheel therein, partitions in the other compartment forming a loop circuit through and around the portion of the wheel therein and including a combustion chamber, a fan for continuously recirculating a body of gaseous regenerating medium through the loop circuit to regenerate the moisture transfer wheel, a fuel burner in said combustion chamber for heating the regenerating medium, said partitions dividing the casing into adjacent compartments forming a sector of the wheel through which air flows into the body of recirculating media, and conduit connected to the loop circuit for exhausting a corresponding amount of the recirculating medium.

12. In an apparatus for conditioning air, an enclosing casing, a first partition means dividing the casing into adjacent compartments, a moisture transfer wheel comprising an air permeable hygroscopic material mounted to rotate in the casing and extending through the first partition means into adjacent compartments, a second partition means extending transversely of the first partition means with sealing means engaging the periphery of the wheel and cooperating with the first partition means to divide each compartment into separate chambers at opposite sides of the wheel, a fan for propelling air to be conditioned through one compartment and the portion of the wheel therein, a third partition means in the other compartment to form a loop circuit therein through and around the wheel, a fan for recirculating a body of regenerating medium in the loop circuit, a heater for heating the recirculating medium, and means for supplying air to and exhausting medium from the body of recirculating medium.

13. An apparatus for conditioning air in accordance with claim 2 in which the transfer elements have partition walls forming closely adjacent axial passages which cooperate with the partitions in the casing to divide the separate passages and prevent flow of air therebetween.

14. Air conditioning apparatus in accordance with claim 2 in which the transfer elements comprise alternate plain and corrugated paper sheets with the corrugations extending axially, and the wheel for transferring moisture having the paper sheets impregnated with a hygroscopic material.

15. An air conditioning apparatus in accordance with claim 13 in which the partitions between adjacent passages comprise sealing elements directly engaging opposite faces of the transfer element.

16. An air conditioning apparatus in accordance with claim 13 in which the partitions in the casing forming the passage for regenerating medium including a combustion chamber at one side of the moisture transfer element, and a path from the other side of the moisture transfer element around the element to the combustion chamber, and a fuel burner in the combustion chamber.

17. An air conditioning apparatus in accordance with claim 1 in which the transfer elements are in the form of wheels, a shaft having spur gears engaging the periphery of the wheels, and power means for rotating the shaft.

18. An air conditioning apparatus in accordance with claim 1 in which the cooling element at one side of the transfer element in the outlet passage is a finned coil, and a cooling tower for delivering cooling water to the coil.

19. An air conditioning apparatus in accordance with claim 1 in which the cooling element between the transfer element and air outlet is an air permeable evaporative pad, and means for supplying water to said pad.

20. An air conditioning apparatus in accordance with claim 8 in which an evaporative pad is provided between the air inlet and heat exchange element, and means for supplying water to said pad.

21. In an apparatus for conditioning air, an enclosing casing having an air inlet and an air outlet, partitions forming a first passage for air flowing from the air inlet to the air outlet and another passage for circulating a body of regenerating medium, an air permeable transfer element comprising a hygroscopic material mounted to move cyclically between said two passages to transfer moisture from the air in said first passage to the body of the medium circulating in said other passage, a fuel burner in the path of the circulating medium arranged to cause the heat from said burner to be directly absorbed in the body of the regenerating medium, and means for exhausting a portion of the regenerating medium and adding a corresponding amount of fresh air to support the direct combustion and to maintain the moisture absorbent capacity of the regenerating medium.

22. An apparatus according to claim 21 having a fan for circulating air from the inlet to the outlet in the first passage, and a second fan for circulating the body of the regenerating medium in the other passage, said fans being so arranged as to produce a higher pressure in said first passage than in said other passage to provide a head sufficient to cause the air to flow towards the other passage in the event of leakage and thereby prevent contamination of air being conditioned by products of combustion.

23. In an apparatus for conditioning air, an enclosing casing having an air inlet and an air outlet, partitions in said casing forming a passage for air flowing from the air inlet, a passage for air flowing to the air outlet and another passage for recirculating a body of regenerating medium in the casing, a plurality of air permeable transfer elements each mounted to rotate through two adjacent passages to transfer thermodynamic characteristics between the air in the different passages, at least one of said transfer elements comprising a hygroscopic material to transfer moisture from the air in one passage to the body of medium recirculating in the casing, a fuel burner in the path of the circulating body of regenerating medium arranged to cause the heat from said burner to be directly absorbed in the body of the regenerating medium, and means for exhausting a portion of the regenerating medium and adding a corresponding amount of fresh air to support direct combustion and to maintain the moisture absorbent capacity of the regenerating medium.

References Cited in the file of this patent

UNITED STATES PATENTS

| | | |
|---|---|---|
| 2,134,544 | Ashley | Oct. 25, 1938 |
| 2,186,844 | Smith | Jan. 9, 1940 |
| 2,197,203 | Buffington | Apr. 16, 1940 |
| 2,200,243 | Newton | May 14, 1940 |
| 2,266,219 | Larriva | Dec. 16, 1941 |
| 2,344,384 | Altenkirch | Mar. 14, 1944 |
| 2,723,837 | Pennington | Nov. 15, 1955 |